United States Patent
Schopf et al.

(10) Patent No.: US 12,266,779 B2
(45) Date of Patent: Apr. 1, 2025

(54) METHOD FOR THE PRODUCTION OF AN ELECTRODE POWDER MIXTURE FOR A BATTERY CELL

(71) Applicant: VOLKSWAGEN AKTIENGESELLSCHAFT, Wolfsburg (DE)

(72) Inventors: Sven Schopf, Braunschweig (DE); Alba Tunas Cantorna, Braunschweig (DE); Bastian Westphal, Sickte (DE); Malte Meitz, Hildesheim (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 24 days.

(21) Appl. No.: 17/560,600

(22) Filed: Dec. 23, 2021

(65) Prior Publication Data

US 2022/0199963 A1 Jun. 23, 2022

(30) Foreign Application Priority Data

Dec. 23, 2020 (DE) ...................... 10 2020 216 546.7

(51) Int. Cl.
*H01M 4/04* (2006.01)
*H01M 4/139* (2010.01)
*H01M 4/62* (2006.01)

(52) U.S. Cl.
CPC .......... *H01M 4/0411* (2013.01); *H01M 4/04* (2013.01); *H01M 4/623* (2013.01); *H01M 4/139* (2013.01)

(58) Field of Classification Search
CPC .... H01M 4/0411; H01M 4/623; H01M 4/139; H01M 4/04
See application file for complete search history.

(56) References Cited

U.S. PATENT DOCUMENTS

| 6,284,192 B1 | 9/2001 | Coonan et al. |
| 11,165,053 B2 | 11/2021 | Zhang et al. |

(Continued)

FOREIGN PATENT DOCUMENTS

| CN | 105144324 A | 12/2015 |
| CN | 110073531 A | 7/2019 |

(Continued)

OTHER PUBLICATIONS

EPO machine generated English translation of WO-2006025600-A1 (Year: 2006).*

(Continued)

*Primary Examiner* — Sean P Cullen
*Assistant Examiner* — Kimberly Wyluda
(74) *Attorney, Agent, or Firm* — PEARL COHEN ZEDEK LATZER BARATZ LLP (57) ABSTRACT

A method for the production of an electrode powder mixture for a battery cell includes filling an active material, a binder and a conductive additive into a filling section of a machine that has a driven screw which extends in the lengthwise direction and which serves for thoroughly blending and conveying a powder in the lengthwise direction. The screw blends the binder, the active material and the conductive additive in order to form a first powder, and the screw makes a second powder out of the first powder in that the binder is fibrillated. The screw produces the electrode powder mixture out of the second powder in that the fibrillated binder is comminuted, and the electrode powder mixture is removed from the machine at a removal opening, whereby the removal opening is at a distance from the filling section in the lengthwise direction.

7 Claims, 3 Drawing Sheets

(56) References Cited

U.S. PATENT DOCUMENTS

| | | |
|---|---|---|
| 11,575,121 B2 | 2/2023 | Kim et al. |
| 2014/0210129 A1 † | 7/2014 | Okafor |
| 2018/0062207 A1 * | 3/2018 | Matsuoka ......... H01M 10/0568 |
| 2019/0280289 A1 † | 9/2019 | Zhang |
| 2020/0168895 A1 | 5/2020 | Kim et al. |

FOREIGN PATENT DOCUMENTS

| | | | |
|---|---|---|---|
| CN | 110692150 A | 1/2020 | |
| KR | 10-2002-0059612 A | 7/2002 | |
| KR | 10-2015-0110718 A | 10/2015 | |
| WO | WO-2006025600 A1 * | 3/2006 | .......... H01M 10/052 |
| WO | WO2014/175756 A1 | 10/2014 | |

OTHER PUBLICATIONS

Search report for German Patent Application No. 10 2020 216 546.7, mailed Sep. 21, 2021.

Search Report for European Patent Application 21214311.9, dated May 16, 2022.

Search Report for Chinese Patent Application No. 202111587040.7, dated Jul. 17, 2024.

* cited by examiner
† cited by third party

METHOD FOR THE PRODUCTION OF AN ELECTRODE POWDER MIXTURE FOR A BATTERY CELL

CROSS REFERENCE TO RELATED APPLICATION

This application claims priority from German Patent Application No. 10 2020 216 546.7, filed Dec. 23, 2020, which is incorporated herein by reference in its entirety.

FIELD OF THE INVENTION

The invention relates to a method for the production of an electrode powder mixture for a battery cell, which is also referred to as an electrode blend. The invention also relates to a method for the production of an electrode for a battery cell. The battery cell is preferably a component of a motor vehicle. The invention also relates to the use of a machine that has a driven screw which extends in the lengthwise direction and which serves for thoroughly blending and conveying a powder in the lengthwise direction.

BACKGROUND OF THE INVENTION

To an increasing extent, motor vehicles are powered, at least partially, by means of an electric motor, meaning that they are configured as electric vehicles or hybrid vehicles. The power supply of the electric motor is normally obtained from a high-voltage battery that comprises several individual battery modules. For the most part, the battery modules have an identical design and they are electrically connected to each other in series and/or in parallel, so that the electric voltage present at the high-voltage battery corresponds to a multiple of the electric voltage supplied by each of the battery modules. Each battery module, in turn, comprises several battery cells that are normally arranged in a shared housing and that are electrically connected to each other in series and/or in parallel.

Each battery cell, also referred to as a battery, has two electrodes, namely an anode and a cathode, as well as a separator arranged between them and also an electrolyte with freely moving charge carriers. A liquid, for example, is employed as such an electrolyte. In an alternative, the battery cell is configured as a solid-state battery and the electrolyte is present as a solid.

The anode and the cathode that form the electrodes of the battery cell normally comprise an arrester/carrier that functions as a current arrester. An active material that is a constituent of a layer applied onto the carrier is affixed thereto. In this context, it is possible for the electrolyte to already be present in the layer, or else for it to be introduced subsequently. However, at least the active material is suitable for receiving the working ions, for instance, lithium ions. Depending on the application as either an anode or a cathode, a different material is employed for the carrier and a different type of material is used for the layer.

In an alternative, the layer is applied in the form of a paste or liquids onto the appertaining carrier—which is also referred to as an arrester—and subsequently dried there. In this process, a solvent contained in the liquid is converted or partially evaporated, so that a solid is created. For purposes of drying the liquid or paste, in other words, in order to extract the solvent, on the one hand, a relatively large amount of energy is required and, on the other hand, it becomes necessary to properly dispose of the solvent that has been released in this process. As an alternative to this, the solvent is recovered so that it can be used again for production purposes. This, however, is relatively time-consuming and energy-intensive.

An alternative to this is a so-called dry coating that does not require the use of a solvent. In this context, however, the mixture consisting of active material and binder that is present in powder form has to have suitable properties so that, after being applied onto the arrester, the contiguous layer is created as a solid. Current methods for the production of such a powder mixture, also referred to as an electrode powder mixture, call for several process steps that build upon each other, so that scalability is not possible at all or else only to an extent that is relatively difficult. Moreover, a continuous provision of the electrode powder mixture is likewise not possible.

SUMMARY OF THE INVENTION

The invention is based on the objective of putting forward a particularly suitable method for the production of an electrode powder mixture for a battery cell, also a particularly suitable use of a machine that has a driven screw which extends in the lengthwise direction and which serves to thoroughly blend and convey a powder in the lengthwise direction, and also a particularly suitable method for the production of an electrode for a battery cell, whereby it is advantageously possible to attain scalability and continuous production.

Regarding the method for the production of an electrode powder mixture, this objective is achieved by means of the features claimed; regarding the use, by means of the features claimed; and regarding the method for the production of an electrode, by means of the features claimed. Advantageous refinements and embodiments are the subject matter of the appertaining subordinate claims.

The method serves for the production of an electrode powder mixture for a battery cell. Preferably, when the battery cell is in its proper state, it is a component of a motor vehicle. The battery cell is suitable, especially provided, and configured towards this end. In its proper state, the battery cell is, for instance, a component of an energy storage means of the motor vehicle comprising several such battery cells. In this context, the battery cells are preferably divided into several battery modules which, in turn, have an identical design. In particular, the battery cells are arranged in a housing of the energy storage means or of the appertaining battery module and are electrically connected to each other in parallel and/or in series. Therefore, the electric voltage present at the energy storage means or battery module corresponds to a multiple of the electric voltage supplied by each of the battery cells. In an advantageous manner, all of the battery cells here have an identical design, thus simplifying their production. The housing is preferably made of a metal, for example, steel such as stainless steel, or an aluminum alloy. A high-pressure die casting method, for example, is used to make the appropriate housing. In particular, the housing is configured so as to be closed. Advantageously, an interface is made into the housing in order to create a connector for the energy storage means or battery module. In this context, electric contact is established between the interface and the battery cell, so that electric energy can be fed into and/or drawn from the battery cell from outside of the energy storage means, provided that an appropriate plug has been inserted into the connector.

The motor vehicle is preferably a ground vehicle and preferably has a number of wheels of which at least one, preferably several or all of them, are powered by a drive. In a suitable manner, one, preferably several, of the wheels are configured so that they can be steered. This makes it possible to move the vehicle independently of a prescribed road surface such as, for instance, rails or the like. In this context, it is advantageously possible to position the motor vehicle essentially on any desired road surface which is preferably made of asphalt, tar or concrete. The motor vehicle is, for example, a utility vehicle such as a truck or a bus. Especially preferably, however, the motor vehicle is a passenger car.

The locomotion of the motor vehicle is advantageously achieved by means of the drive. For instance, the drive, especially the main drive, is configured so as to be at least partially electric, and the motor vehicle is, for example, an electric vehicle. The electric motor is operated, for instance, by means of the energy storage means that is suitably configured as a high-voltage battery. The high-voltage battery advantageously provides electric direct voltage, whereby the electric voltage ranges, for example, from 200 volts to 800 volts, and essentially 400 volts by way of an example. Preferably, an electric converter is arranged between the energy storage means and the electric motor and it serves to energize the electric motor. In an alternative, the drive additionally has an internal combustion engine so that the motor vehicle is configured as a hybrid vehicle. In an alternative, the energy storage means supplies a low-voltage on-board system of the motor vehicle, and it also especially provides electric direct voltage of 12 volts, 24 volts or 48 volts.

In an alternative, the battery cell is a component of a forklift truck, an industrial installation or a handheld device such as, for instance, a tool, especially a cordless electric screwdriver. In another alternative, the battery cell is a component of an energy supply unit and is employed, for example, as a so-called buffer battery. In another alternative, the battery cell is a component of a portable device, e.g. a portable mobile telephone, or another wearable. It is likewise possible to use such a battery cell in the realms of camping and model building or for other outdoor activities.

When the battery cell—also referred to as a battery—is in its proper state, it is a galvanic element having two electrodes, namely an anode and a cathode. A separator is advantageously arranged between them and the battery preferably comprises an electrolyte that provides a plurality of freely moving charge carriers such as, for example, lithium ions. For instance, the electrolyte is a component of the anode and/or of the cathode, or it is at least suitable to accumulate there and thus be picked up by the anode and/or the cathode. The battery cell is, for instance, a solid-state battery so that the electrolyte is present as a solid. Alternatively, the electrolyte is in liquid form.

Each of the electrodes comprises an arrester that is also referred to as a carrier. In particular, a layer is applied onto each arrester, whereby at least one of the layers has been made of the electrode powder mixture. Here, the electrode powder mixture is adapted to the electrode in question, in other words, to the anode or to the cathode, so that it is either an anode powder mixture or a cathode powder mixture.

The method for the production of the electrode powder mixture, also referred to as the blend or electrode blend, provides that a machine is used which has a driven screw that extends in the lengthwise direction. In this context, the screw, which is especially referred to as a spindle, serves to thoroughly blend and convey a powder in the lengthwise direction, and the screw is suitable, especially provided and configured towards this end. The screw especially has a spiral and/or helical shape. An active material, a binder and a conductive additive are filled into a filling section of the machine. For example, the filling section is in the form of a single opening, or else the filling section has several openings, whereby a different material among those mentioned above is filled into each one of the openings. Thus, for instance, the active material is filled in through one of the openings, while the binder is filled in through another opening and the conductive additive is filled in via yet another opening. This improves the metering capability. As an alternative, two different materials among those mentioned above are filled into one of the openings. For instance, the openings are in the same position in the lengthwise direction or else they are offset relative to each other in the lengthwise direction.

In particular, each one of the openings is formed by an appropriate funnel, so that essentially continuous filling is made possible. Advantageously, the active material, the binder and the conductive additive are each present in the form of powder or granules. Following the filling procedure, the screw preferably performs the comminution and/or grinding so that any granules are processed into a powder or at least the particle size is reduced. For this purpose, especially in the filling section or at a relatively short distance from it, the screw has a grinder, for instance, toothed wheels so that the constituents can be ground up to form the powder. The screw also blends the binder, the active material and the conductive additive in order to form a first powder and it also transports it in the lengthwise direction away from the filling section. In summary, during the blending, especially the individual constituents and/or all of the constituents present in the first powder are at least partially ground up, and they are then present in powder form. In this context, the first powder is preferably homogenous.

Moreover, the screw is used to produce a second powder out of the first powder in that the binder is fibrillated. The screw is adapted accordingly for this purpose, and it has a kneader or kneading elements. In particular, trapezoidal structures serve to form these elements so as to be perpendicular to the lengthwise direction. During fibrillation, the binder is drawn in order to create individual fibers so that the binder is present in the second powder in the form of fibers or clusters, whereby the second powder contains several such fibers. In summary, the fibrillation especially causes the individual particles of the binder to each be drawn in order to form a thin fiber. Due to the conveying effect of the screw, the position of the second powder is offset relative to the first powder in the lengthwise direction, and between them, there is especially a transition area in which the binder is present in at least partially fibrillated form.

The screw is used to produce the electrode powder mixture out of the second powder in that the fibrillated binder is comminuted once again. For this purpose, the screw is advantageously adapted in an appropriate manner and it has, for instance, a toothed wheel or the like. Consequently, the individual binder fibers are disaggregated by means of the screw so that each of these fibers ends up having a certain length. Here, however, the individual fibers of the binder are at least partially retained, but in the electrode powder mixture, they have a diminished length.

In summary, the screw transports the active material, the binder, and the conductive additive in the lengthwise direction from the filling section to the removal opening, whereby the removal opening is at a distance from the filling section in the lengthwise direction. While the binder is being activated by means of the screw, the binder is distributed in the active material and in the conductive additive and subsequently activated as well as crosslinked with the other constituents, so that an agglomeration is attained. Thus, the electrode powder mixture is flowable and dust-free. The method then provides for the electrode powder mixture to be removed from the machine at a removal opening. If the electrode powder mixture is then heated up or exposed to pressure, a solid that can be used as the layer of an electrode is formed out of the electrode powder mixture owing to the activated binder.

In the method, the machine is especially operated continuously and the active material, the binder and the conductive additive are filled in continuously. Moreover, the other process steps are preferably carried out essentially continuously so that the electrode powder mixture is produced continuously. This allows a continuous processing of the electrode powder mixtures to form an electrode, whereby especially a varying process speed can also be selected on an as-needed basis. Moreover, the method is designed so as to be scalable. In particular, the produced electrode powder mixtures are free of solvents, and in order to make the electrode, it is not necessary either to add a solvent to the electrode powder mixture that then would have to be subsequently removed or converted. Consequently, the material requirement and energy demand are reduced.

Preferably, the machine is divided into three different sections, whereby different powders are produced in each of the sections. In particular, there are elements situated between the individual sections by means of which the individual powder constituents are held back if they do not meet certain specifications. Such elements include, for example, steps or other return conveying elements. Thus, in particular, it is merely possible to feed only the first powder into the second section, which is especially where the second powder is produced, in other words, a homogenous mixture of the active material, the binder and the conductive additive. If a homogenous mixture is not yet present, it is especially held back, or else the transitions of the sections of the machine are especially arranged relative to each other in such a way, preferably at a distance from each other, that only the first powder can enter the second section. By the same token, preferably owing to the return conveying elements, only the second powder can enter the third section where the fibrillated binder is comminuted. Moreover, the removal opening is preferably positioned in such a way that only the electrode powder mixture but no other constituents of the second powder, in other words, only a powder in which the fibrillated binder has already been comminuted, can be removed there. Preferably, the machine here does not have a nozzle at the removal opening, so that no pressures arise there and a shearing effect is avoided.

The screw is preferably adapted accordingly, so that it can be used to perform the individual tasks, in other words, the blending, the fibrillating, and the comminuting can be suitably carried out. For this purpose, the screw preferably has certain elements in the individual sections. Thus, for example, in the first section where the first powder is produced, the screw has a helix and/or toothed wheels so that comminution takes place there. Therefore, in particular, substantial blending and comminution occur in the first section, resulting in homogenization. Kneading elements are preferably situated in the second section where the fibrillation of the binder takes place. The second section is characterized by a high kneading and shearing effect of the screw, so that the binder is fibrillated. In the third section, which is where the electrode powder mixture is produced, a moderate comminution effect prevails so that the fibrillated binder is comminuted and the flowable, dust-free electrode powder mixture is produced.

Lithium-metal-oxide, such as lithium-cobalt(III)-oxide ($LiCoO_2$), NMC, NCA, LFP, GIC, LTO, for example, are employed as the active material. As an alternative, NMC622 or NMC811 is used as the active material. PTFE, that is to say, polytetrafluorethylene, is preferably used as the binder. In this case, the fibrillation is simplified, whereby a cross-linking with the other filled-in constituents also takes place. Thus, activation is simplified so that the layer of the electrode exhibits improved properties. At least, however, the binder contains PTFE. For instance, the binder comprises another constituent so that it is present in the form of a mixture. For example, the additional constituent is PVDF (polyvinylidene fluoride). As an alternative, PVDF is used as the binder. For instance, conductive carbon black, conductive graphite or nanotubes are used as the conductive additive.

For example, the active material, the binder and the conductive additive are only blended by means of the machine, and the individual constituents are filled into the machine separately. Especially preferably, however, the active material and the binder are already premixed before being filled into the machine. Advantageously, premixing with the conductive additive does not take place so that, for example, during the comminution of the agglomerates, especially consisting of the binder and the active material, no deagglomeration occurs at all or else it is at least reduced. Consequently, only a relatively slight blending using the machine is needed, namely, in order to admix in the conductive additive. As a result, the machine can be configured to be relatively compact in the lengthwise direction. In other words, the demand made of the machine in terms of thorough blending is reduced, and at least part of the blending of the binder with the active material is carried out separately. Thus, the first section of the machine can be configured to be relatively compact and to optimize the screw exclusively with an eye towards the blending of the conductive additive with the other constituents. Preferably, a comminution of the active material and/or of the binder, if they are present in the form of granules, also takes place during the premixing. Therefore, after the premixing, the mixture of active material and binder has essentially the same particle size, which simplifies the further blending with the conductive additive. Preferably, an ultracentrifuge mill is used for the preparation.

For example, the electrode powder mixture undergoes immediate further processing and is thus produced only for the momentary demand. This is especially made possible due to the scalability and the continuous production method. As an alternative to this, the electrode powder mixture is filled into a silo or some other form of intermediate storage after it has been taken out of the machine. Consequently, inventory can be kept on hand so that, on the one hand, a fluctuating demand can be met and, on the other hand, in this manner, there is no need for an interruption of the production of the electrodes if the starting materials are not always available.

For example, an extruder that has only one screw is used as the machine. Especially preferably, however, the machine comprises a second screw that likewise extends in the lengthwise direction and that meshes with the first screw. For example, both of the screws have an identical design or else they are different. When the machine is operated, the two screws are each rotated around an axis that is parallel to the lengthwise direction, and the two screws intermesh with each other. In this context, the direction of rotation is, for example, the same or preferably different. As a result, a blending result is improved so that the first powder is more homogenous. The kneading process is also improved by the second screw, which is why the fibrillation of the binder is improved. Moreover, the subsequent comminution of the fibrillated binder by means of the second screw can be set relatively precisely. In summary, owing to the second screw, the quality of the electrode powder mixture is improved, whereby the installation size of the machine can be reduced in the lengthwise direction.

For example, the machine comprises additional screws, and the machine is configured, for example, as a planetary extruder. In an alternative to this, the machine is a continuous kneader, which is why the kneading result is improved, that is to say, especially the fibrillation process. Here, the fact that the kneading machine, that is to say, the kneader, is configured so as to be continuous allows a continuous production of the electrode powder mixture. Here, it is also possible for at least one of the screws to be arranged perpendicular to the lengthwise axis. Especially preferably, however, the machine is a twin-screw extruder, whereby the two screws rotate, for example, in the same direction or in the opposite direction. Thus, an already available machine for the production of the electrode powder mixture can be used, which is why a relatively expensive new development is not necessary. Moreover, in the case of a twin-screw extruder, it is relatively easy to adapt the two screws to the momentary requirements, and/or already available components can be used, so that no new construction is required.

A machine that has a driven screw that extends in the lengthwise direction and that serves to blend and convey a powder in the lengthwise direction is used for the production of an electrode powder mixture, especially of a blend, for a battery cell. For example, an extruder, preferably a twin-screw extruder, is employed as the machine. Here, the machine is advantageously used to carry out a method in which first of all, an active material, a binder and a conductive additive are placed into the machine and blended by means of the screw in order to form a first powder. The first powder is processed by means of the screw into a second powder, whereby the binder is fibrillated for this purpose. The screw creates the electrode powder mixture out of the second powder in that the fibrillated binder is comminuted. Preferably, the machine comprises a control unit that is suitable, preferably provided and configured, to carry out the method. In particular, the invention also comprises such a machine.

In a suitable manner, various sections are formed in the machine, whereby each of the sections serves to produce the powder in question, and whereby the powder in question, in other words, the first powder, the second powder or the electrode powder mixture, is present at the end of the particular section in the lengthwise direction. In particular, there are return conveying elements between the sections so that each time, only the finished powder can leave the appertaining section. The sections differ especially in terms of the shape of the individual screw, that is to say, especially the elements of the screw.

The method for the production of an electrode for a battery cell provides that, first of all, an electrode powder mixture is produced. The electrode powder mixture is then subsequently applied onto an arrester, preferably by means of a roller press, a calender or a roller mill. The arrester is especially made of a metal and it is, for example, a metal foil. Advantageously, aluminum or a copper is used as the metal. The arrester especially has a flat or strip-like shape. Preferably, before the electrode powder mixture is applied onto the arrester, an adhesion promoter layer is applied so as to improve the adhesion of the electrode powder mixture.

The adhesion promoter layer consists, for example, of a carbon and a binder or the binder.

Subsequently, a layer that is, for instance, contiguous, is made out of the electrode powder mixture. For this purpose, especially the electrode powder mixture and/or the arrester is/are heated up and, for example, pressure is exerted onto the electrode powder mixture in the direction of the arrester. In particular, a calender is used for this purpose, for example, a 4-roller calender, so that the arrester is provided with the layer on both sides. Particularly in a calendering process, the calender ensures a given thickness of the electrode powder mixture on the arrester and thus the thickness of the layer.

In summary, the electrode powder mixture serves to create the layer that is applied onto the arrester and that comprises the active material of the electrode in question. The material of the arrester and/or the active material are selected as a function of the electrode, that is to say, if it is a cathode or an anode. Preferably, the production of the electrode does not involve the use of a solvent that then would have to be removed from the electrode powder mixture in order to produce the layer. In other words, the method for the production of the electrode is free of solvents.

The invention also relates to an electrode produced in this manner as well as to a battery cell having two electrodes, whereby at least one of the two electrodes, preferably both of them, were produced by means of such a method.

The advantages and refinements described in conjunction with the two methods can be applied analogously to the use, to the electrode, to the battery, to the machine as well as among each other and conversely.

BRIEF DESCRIPTION OF THE DRAWINGS

Embodiments of the invention are explained in greater detail below with reference to a drawing. The following is shown.

Corresponding parts are provided with the same reference numerals in all of the figures.

DETAILED DESCRIPTION OF THE INVENTION

Figure 1:
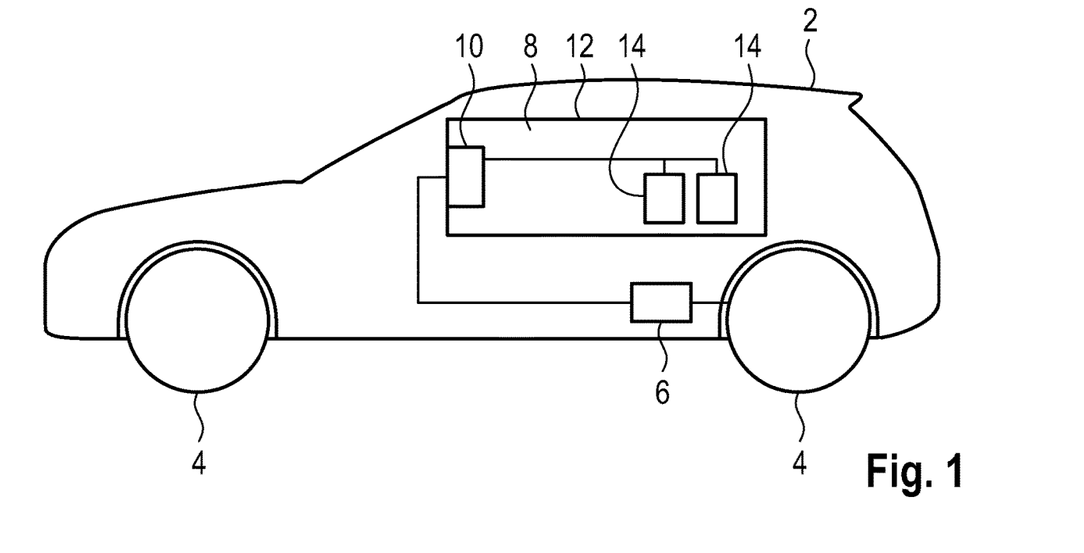
FIG. 1 schematically simplified, a motor vehicle that has a high-voltage battery with several identically designed battery cells, FIG. 2 a side view of one of the identically designed battery cells, FIG. 3 a process diagram of a method for the production of an electrode for a battery cell that comprises a method for the production of an electrode powder mixture, FIG. 4 schematically simplified in a sectional view along a lengthwise direction, a machine which has a driven screw that extends in the lengthwise direction for blending and conveying a powder in the lengthwise direction, and FIG. 5 according to FIG. 3, an alternative embodiment of the method for the production of an electrode for a battery cell.

FIG. 1 schematically shows a motor vehicle 2 in the form of a passenger car. The motor vehicle 2 has a number of wheels 4 of which at least some are powered by means of a drive 6 comprising an electric motor. Thus, the motor vehicle 2 is an electric vehicle or a hybrid vehicle. The drive 6 has a converter by means of which the electric motor is supplied with power. The converter of the drive 6, in turn, is supplied with power by means of an energy storage means 8 in the form of a high-voltage battery. For this purpose, the drive 6 is connected to an interface 10 of the energy storage means 8 that is installed in a housing 12 of the energy storage means 8, said housing 12 being made of a noble metal. Multiple battery modules are arranged inside the housing 12 and they are electrically contacted with each other. In this context, some of the battery modules are electrically connected to each other in series and these, in turn, are electrically connected to each other in parallel. The electric assembly of the battery modules is electrically contacted with the interface 10 so that, during operation of the drive 6, the battery module is discharged or charged (recuperation). Owing to the electric interconnection, the electric voltage, amounting to 400 V, that is supplied at the interface 10 is a multiple of the electric voltage supplied to each of the identically designed battery modules.

Each battery module, in turn, has several battery cells 14, two of which are shown here. Some of the battery cells 14 of each battery module are electrically connected to each other in series. The strands formed in this manner, in turn, are electrically connected to each other in parallel. Consequently, the electric voltage supplied by each of the battery modules is a multiple of the voltage supplied by one of the identically designed battery cells 14, which are each configured as lithium-ion battery cells.

Figure 2:
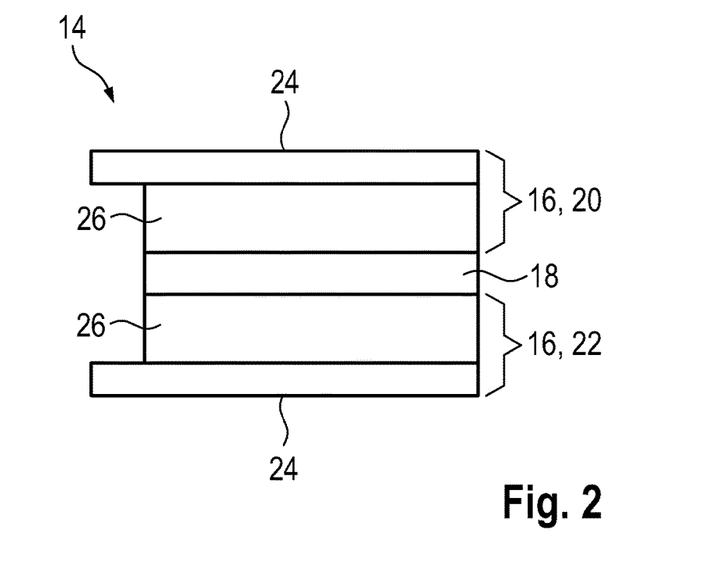

FIG. 2 shows a side view of one of the identically designed battery cells 14. The battery cell 14 has two electrodes 16 that are separated from each other by a separator 18. The two electrodes 16 and the separator 18 are stacked one above the other and are each in direct contact with each other. One of the electrodes 16 is an anode 20 while the other electrode 16 is a cathode 22.

Figure 3:
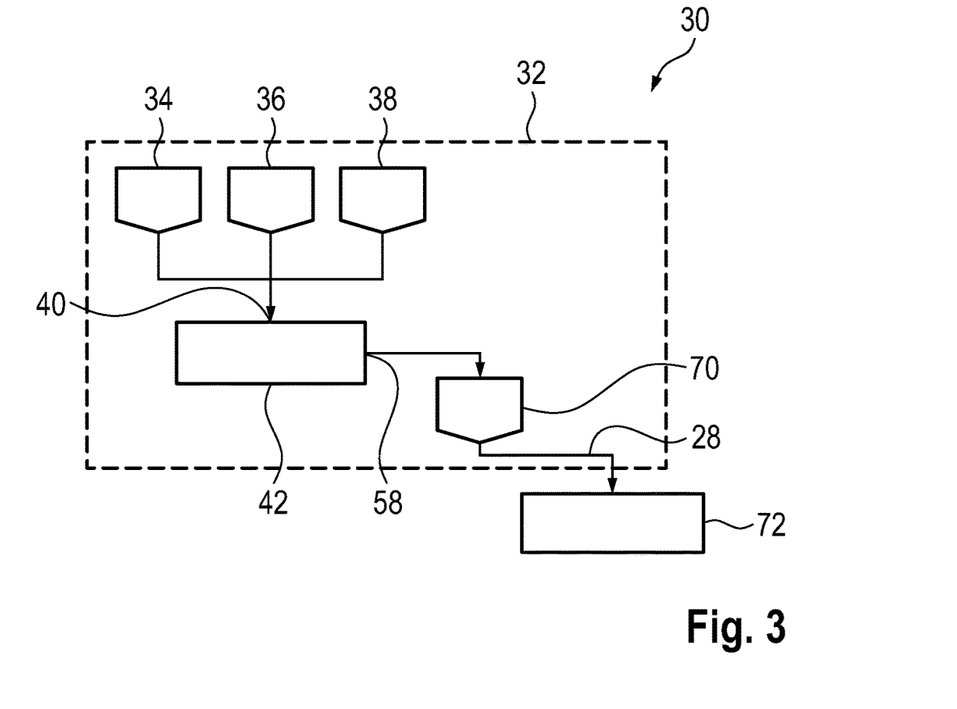

The two electrodes 16 are structured identically to each other and each has an arrester 24, also referred to as a carrier, that is made of a metal foil. In the case of the anode 20, the arrester 24 is made of a copper foil and in the case of the cathode 22, it is made of an aluminum foil. Each arrester 24 has a layer 26 applied onto it that was made of a hardened electrode powder mixture 28 (FIG. 3). In the case of the anode 20, the electrode powder mixture 28 is an anode powder mixture and in the case of the cathode 22, it is a cathode powder mixture. The thickness of each of the layers 26 is between 60 μm and 100 μm.

FIG. 3 shows a process diagram of a method for the production of one of the electrodes 16. Here, for example, one of the two electrodes 16 or both of them have been made according to the method 30, whereby the starting materials are different here. The method 30 for the production of the electrode 16 comprises a method 32 for the production of the electrode powder mixture 28. In the method 32 for the production of the electrode powder mixture 28, first of all, an active material 34 such as NMC (nickel manganese cobalt), a binder 36 and a conductive additive 38 are provided. Here, PTFE (polytetrafluorethylene) is used as the binder 36 and conductive carbon black is used as the conductive additive 38. The active material 34, the binder 36 and the conductive additive 38 are filled into a filling section 40 of a machine 42, whereby the active material 34 and the binder 36 are present in the form of granules, at least partially.

Figure 4:
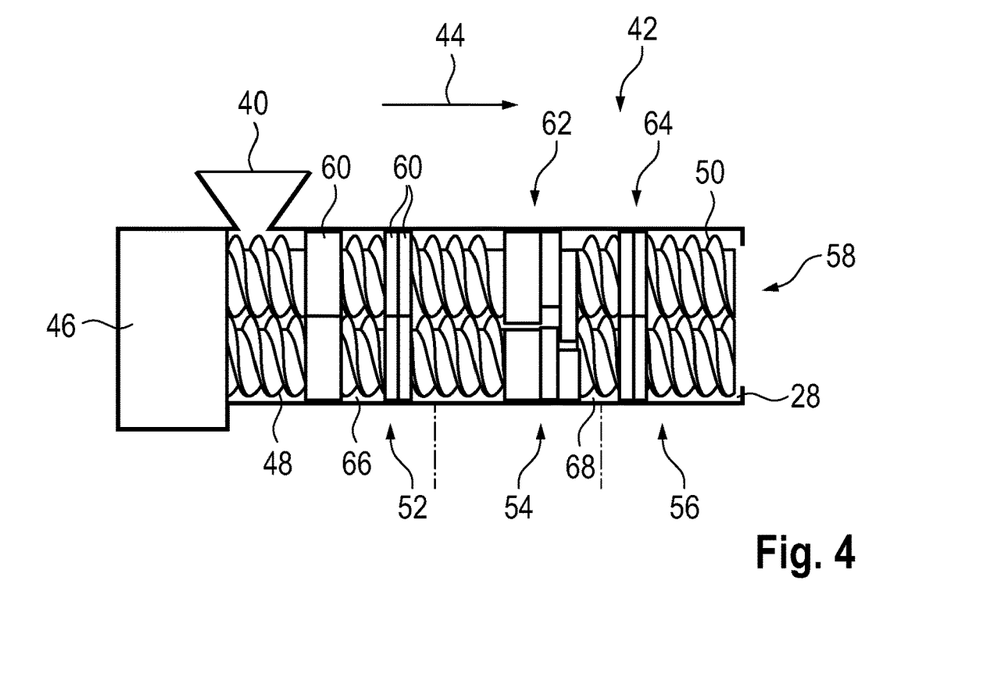

FIG. 4 shows the machine 42 in a sectional view along a lengthwise direction 44. The machine 42 has a drive 46 by means of which a screw 48 and a second screw 50 are driven, both of which extend in the lengthwise direction 44 and mesh with each other. Here, the screw 48 and the second screw 50 serve to thoroughly blend and convey a powder in the lengthwise direction 44. The drive 4 rotates the two screws 48, 50 opposite to each other around an axis that is parallel to the lengthwise direction 44. The machine 42 is a twin-screw extruder that is thus used for the production of the electrode powder mixture 28.

The two screws 48, 50 run through a first section 52 that is delimited by the drive 46, through a second section 54 and through a third section 56 that ends at a removal opening 58. Here, the second section 54 is situated between the first section 52 and the third section 56, and return conveying elements (not shown in greater detail here) are arranged between these sections. The filling section 40, which is configured as a funnel, opens up into the first section 48. A first grinder 60—which has several toothed wheels that mesh with each other—is formed by means of the two screws 48, 50 in the first section 52, whereby the same number of toothed wheels is associated with each of the screws 48, 50.

In the second section 54, the two screws 48, 50 form a kneader 62 that comprises several trapezoidal elements, which partially mesh with each other. Here, too, the same number of trapezoidal (kneading) elements is associated with each of the screws 48, 50. In the third section 56, a second grinder 64 is formed by the two screws 48, 50, and it likewise has several meshing toothed wheels that are associated with the two screws 48, 50. The second grinder 64 has fewer toothed wheels than the first grinder 60, so that the comminution effect is diminished there. When the drive 46 is operated, the two screws 48, 50 are rotated, thereby operating the grinders 60, 64 and the kneader 64.

Each of the screws 48, 50 is configured to be helical or screw-like between the first grinder 60, the kneader 62, and the second grinder 64, so that these screws 48, 50 serve to convey a powder that is situated between the two screws 48, 50 in the lengthwise direction 44 from the filling section 40 towards the removal opening 58 that is at a distance from the filling section 40 in the lengthwise direction 44.

In the method 32 for the production of the electrode powder mixture 28, after the binder 36, the active material 34 and the conductive additive 38 have been filled through the filling opening 40, the two screws 48, 50 blend them in order to form a first powder 66, whereby the coarser constituents are comminuted by means of the first grinder 60. The two screws 48, 50 convey the first powder 66 in the lengthwise direction 44 to the second section 54. In this process, the return conveying elements hold back the coarser or more granular constituents, and only once they have been blended in order to form the homogenous first powder 66 and have a suitable particle size are they allowed to pass through into the second section 54.

In the second section 54, the screws 48, 50, namely, using the kneader 62, knead the first powder 66 and, in the process, they fibrillate the binder 36. Subsequently, this creates individual fibers of the binder 36 that is present only in powder form or particulate form in the first powder 66. Once the binder 36 has been fibrillated in the first powder 66, it is then used in order to form a second powder 68 that consequently comprises the ground-up active material 34 and the conductive additive 38 into which the fibrillated binder 36 is blended and with which the fibrillated binder 36 is cross-linked. In summary, the second powder 68 is made out of the first powder 66 in that the binder 36 is fibrillated.

The second powder 68 is conveyed in the lengthwise direction 44 to the third section 56 by means of the two screws 48, 50. Here, however, the return conveying elements prevent the first powder 66 from being conveyed into the third section 56. In the third section 56, the second grinder 64 comminutes the fibrillated binder 36, thereby activating it. Once the fibrillated binder 36 has been comminuted, the production of the electrode powder mixture 28 is finished, and it is conveyed out of the removal opening 58 by means of the two screws 48, 50, thereby being removed from there. Return conveying elements are arranged there, too, so as to prevent the removal of the second powder 68.

If the drive 46 is operated continuously and if the conductive additive 34, the binder 36 and the conductive additive 38 are filled into the filling section 40 continuously, then the electrode powder mixture 28 is produced continuously, whereby the production rate of the electrode powder mixture 28 is set as a function of the drive speed of the two screws 48, 50. This yields a scalable process. Moreover, the electrode powder mixture 28 is free of solvents.

Subsequently, the electrode powder mixture 28, which is dust-free as well as is flowable, and which has been produced by the machine 42 is filled into a silo 70 or into some other storage facility, thus allowing inventory keeping and storage. Once the electrode powder mixture 28 has been removed from the silo 70, the method 32 for the production of the electrode powder mixture 28 is completed. However, it is also possible not to use the silo 70 or not to provide it at all, so that when the electrode powder mixture 28 is removed from the machine 42, the method 30 for the production of the electrode powder mixture 28 is completed. In this case, always the specifically required amount of the electrode powder mixture 28 is produced.

In a variant, not shown here in greater detail, of the method 32 for the production of the electrode powder mixture 28, the active material 34, the binder 36 and the conductive additive 38 are filled separately into the machine 42. In a refinement of this, the conductive additive 38 is filled in after the blending of the active material 34 with the binder 36 and thus after their homogenization. Here, in particular, the conductive additive 38 is filled in in the lengthwise direction 44 downstream from the first grinder 60 or at the beginning of the second section 54.

In the method 30 for the production of the electrode 16, the electrode powder mixture 28 is then applied onto the appertaining arrester 24. Since the electrode powder mixture 28 is flowable, it is applied by being poured into the calender gap of a 4-roller calender. A calendering process 72, which makes use of the 4-roller calender, exerts a force and shear onto the electrode powder mixture 28 in the direction of the appertaining arrester 24, a process in which the electrode powder layer 28 is heated up. As a result, the appertaining binder 36 is activated and the corresponding layer 26 is produced out of the electrode powder mixture 28.

Figure 5:
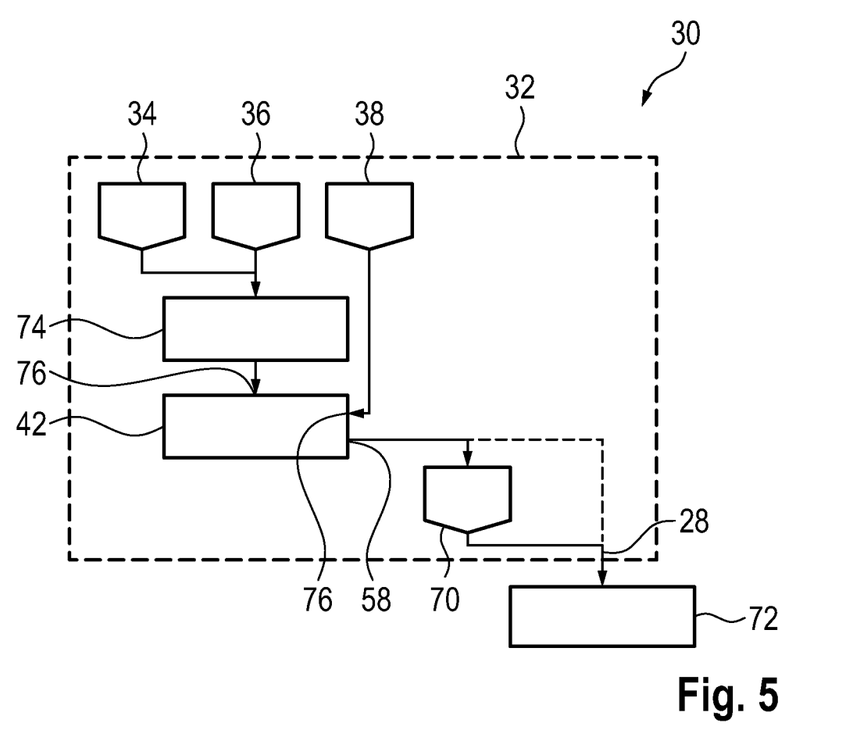

FIG. 5 shows an alternative embodiment of the method 30 for the production of the electrode 16, whereby only the method 32 is modified for the production of the electrode powder mixture 28. In contrast, the calendering process 72 is not changed. However, the active material 34 and the binder 36 are first premixed employing an ultracentrifuge mill 74, whereby some of the individual constituents are partially ground up. Only after this procedure are the constituents filled into the machine 42. Here, for example, in turn, only the funnel that forms the filling section 40 is present. However, it is also possible for the machine to have two filling openings 76 that are at a distance from each other and that together form the filling section 40. Here, the active material 34 that has been premixed with the binder 36 is filled into one of the filling openings 76. The conductive additive 38 is filled into the remaining filling openings 76. This approach prevents deagglomeration and the homogeneity of the first powder 66 is increased. As is the case with the preceding embodiment, there is a silo 70, or else it can be omitted or not used, so that the electrode powder mixture 28—also referred to as an electrode blend—that is removed from the removal opening 58 is fed directly to the calendering process 72.

The invention is not limited to the embodiment described above. Rather, other variants of the invention can also be derived by the person skilled in the art without departing from the subject matter of the invention. In particular, all of the individual features described in conjunction with the individual embodiments can also be combined in another manner without departing from the subject matter of the invention.

LIST OF REFERENCE NUMERALS 2 motor vehicle
4 wheel
6 drive
8 energy storage means
10 interface
12 housing
14 battery cell
16 electrode
18 separator
20 anode
22 cathode
24 arrester
26 layer
28 electrode powder mixture
30 method for the production of an electrode
32 method for the production of an electrode powder mixture
34 active material
36 binder
38 conductive additive
40 filling section
42 machine
44 lengthwise direction
46 drive
48 screw
50 second screw
52 first section
54 second section
56 third section
58 removal opening
60 first grinder
62 kneader
64 second grinder
66 first powder
68 second powder
70 silo
72 calendering process
74 ultracentrifuge mill
76 filling opening

The invention claimed is:

1. A method for the production of an electrode powder mixture for a battery cell, comprising:
    filling an active material, a binder and a conductive additive into a filling section of a machine that has a first driven screw which extends in a lengthwise direction and which serves for thoroughly blending and conveying a powder in the lengthwise direction,
    using the first screw, blending the binder, the active material and the conductive additive in order to form a first powder in a first section of the machine, wherein the binder, the active material and the conductive additive are homogenized by a first grinder having a plurality of teeth, conveying the first powder from the first section to a second section by means of the first screw, using the first screw, forming a second powder out of the first powder in the second section of the machine, wherein the binder is fibrillated, wherein during fibrillation the binder is drawn in order to create individual fibers so that the binder is present in the second powder in the form of fibers or clusters, whereby the second powder contains several such fibers, conveying the second powder to a third section by means of the first screw, using the first screw, producing the electrode powder mixture out of the second powder in the third section of the machine, wherein the fibrillated binder is comminuted using a second grinder having a plurality of teeth, wherein the second grinder has fewer teeth than the first grinder, such that individual fibers present in the second powder are disaggregated so that each has a certain length, and removing the electrode powder mixture from the machine at a removal opening, wherein the removal opening is at a distance from the filling section in the lengthwise direction.

2. The method according to claim 1, wherein PTFE is used as the binder.

3. The method according to claim 1, wherein the active material and the binder are premixed before being filled into the machine.

4. The method according to claim 1, wherein the electrode powder mixture is filled into a silo.

5. The method according to claim 1, wherein the machine has a second screw that extends in the lengthwise direction and meshes with the first screw.

6. The method according to claim 5, wherein a twin-screw extruder is used as the machine.

7. A method for the production of an electrode for a battery cell, comprising producing an electrode powder mixture by the method according to claim 1, wherein the electrode powder mixture is applied onto an arrester.

* * * * *